(12) United States Patent
Davies

(10) Patent No.: US 7,043,749 B1
(45) Date of Patent: May 9, 2006

(54) AUDIO-VIDEO PACKET SYNCHRONIZATION AT NETWORK GATEWAY

(75) Inventor: Steven Gareth Davies, Cirencester (GB)

(73) Assignee: Tandberg Telecom AS, Lysaker (NO)

( * ) Notice: Subject to any disclaimer, the term of this patent is extended or adjusted under 35 U.S.C. 154(b) by 0 days.

(21) Appl. No.: 09/623,058

(22) PCT Filed: Feb. 24, 1999

(86) PCT No.: PCT/GB99/00570

§ 371 (c)(1),
(2), (4) Date: Nov. 13, 2000

(87) PCT Pub. No.: WO99/44363

PCT Pub. Date: Sep. 2, 1999

(30) Foreign Application Priority Data

Feb. 27, 1998 (GB) .................................. 9804071
Dec. 23, 1998 (GB) .................................. 9828513

(51) Int. Cl.
*H04N 7/16* (2006.01)
*H04N 7/173* (2006.01)

(52) U.S. Cl. ........................... 725/120; 725/62; 725/91; 725/114; 725/120; 725/136; 725/138; 455/3.01; 455/403; 455/550; 455/553.1

(58) Field of Classification Search ................ 725/120, 725/136, 138, 62, 63, 73, 86, 91, 105, 114, 725/118; 348/181, 189, 192, 484, 515, 516, 348/518; 370/352, 355, 356, 389, 392, 465, 370/503; 715/716, 721; 709/224, 233; 455/3.01, 455/403, 550, 553.1
See application file for complete search history.

(56) References Cited

U.S. PATENT DOCUMENTS 4,360,827 A    11/1982   Braun (Continued)

FOREIGN PATENT DOCUMENTS

JP          03135244        6/1991

(Continued)

OTHER PUBLICATIONS

Willebeek-Lemiar M H et al.: "On Multipoint Control Units for Videoconferencing": Oct. 2, 1994, pp. 356-364.

(Continued)

*Primary Examiner*—Kieu-Oanh Bui
(74) *Attorney, Agent, or Firm*—Oblon, Spivak, McClelland, Maier & Neustadt, P.C.

(57) ABSTRACT

A method and apparatus for synchronizing sound and images in a real-time multimedia communication, such as an audio-video telephone call, through a network gateway, when the source and/or the destination of the audio signals, and optionally also the video signals, are from and/or to separate audio and video communication devices.

19 Claims, 10 Drawing Sheets

U.S. PATENT DOCUMENTS

| | | | |
|---|---|---|---|
| 4,963,967 A * | 10/1990 | Orland et al. | 348/484 |
| 5,473,363 A | 12/1995 | Ng et al. | |
| 5,526,034 A * | 6/1996 | Hoarty et al. | 725/138 |
| 5,625,404 A | 4/1997 | Grady et al. | |
| 5,640,388 A | 6/1997 | Woodhead et al. | |
| 6,038,230 A * | 3/2000 | Ofek | 370/389 |
| 6,259,677 B1 * | 7/2001 | Jain | 370/252 |
| 6,259,691 B1 * | 7/2001 | Naudus | 370/352 |
| 6,414,960 B1 * | 7/2002 | Kuhn et al. | 370/395.64 |
| 6,421,720 B1 * | 7/2002 | Fitzgerald | 709/224 |
| 6,567,399 B1 * | 5/2003 | Schuster et al. | 370/352 |
| 6,611,537 B1 * | 8/2003 | Edens et al. | 370/503 |

FOREIGN PATENT DOCUMENTS

| | | |
|---|---|---|
| JP | 03139034 | 6/1991 |
| WO | WO 97/10674 A1 | 3/1997 |
| WO | WO 97/44957 A1 | 11/1997 |

OTHER PUBLICATIONS

Civanlar M H et al.: "A practical system for MPEG-2-based videoon-demand over ATM packet networks and the WWW": Signal Processing, Image Communication., vol. 8, No. 3, Apr. 1, 1996, p. 221-227.

* cited by examiner

AUDIO-VIDEO PACKET SYNCHRONIZATION AT NETWORK GATEWAY

BACKGROUND OF THE INVENTION

1. Field of the Invention

The present invention relates to a method and apparatus for synchronising sound and images in a real-time multimedia communication, such as an audio-video telephone call, through a network gateway, referred to herein as "gateway", when the source and/or the destination of the audio signals, and optionally also the video signals, is from and/or to separate audio and video communication devices, for example audio telephony and video telephony devices.

2. Description of Related Art

Known multimedia communication terminals are integrated devices, that is, they contain both audio and video communication portions linked together with internal circuitry and/or software which synchronise audio and video digital data or analogue signals (herein referred to collectively as "signals"), and hence corresponding audible and visible output from the integrated terminal. Such synchronisation is particularly desirable in order to achieve so-called "lip-synch" in audio-video telephony. In practice, for the signals to be effectively synchronized, it has been found in the broadcast industry that the visible output should lead the audible output by no more than about 20 ms, and should lag the audio signal by no more than about 40 ms.

Prior art patent document WO 97/10674 discloses a multimedia conferencing system having a number of integrated multimedia terminals, each of which has its own interface module that permits each terminal to connect to others through a telecommunications network. Audio and video data are communicated separately through the network, which reduces use or high bandwidth lines or channels through the network.

Examples of known integrated terminals operating according to the ITU-T Recommendation H.320 "Narrow-band Visual Telephone Systems and Terminal Equipment" include those sold by PictureTel Corporation under the trade mark the Venue-2000 and those sold by VTEL Corporation under the trade mark Enterprise Series Room System TC1000. Intel Corporation sells a business video conferencing system under the product code PCVD1013ST that operates according to the H.320 and H.323 standards. An example of a known integrated terminal operating according to the H.324 standard is those sold by 8×8 Inc. under the trade mark ViaTV Phone.

Such known terminals are designed to function in an audio-only mode, so that these can function as a simple telephone when communicating with another telephony terminal.

Such integrated devices have yet to become widely adopted, and one reason for this is what whilst such devices may function as a telephone, users still need a conventional telephone for communication, for example with other telephones on the same PBX exchange, or with external telephones. Many PBX manufacturers now support ISDN lines to the desktop for the provision of multimedia communication terminals, according to the H.320 standard. Unfortunately, different manufacturers provide different levels of functionality (for example, features such as call hold, call transfer and call forward), not all of which are supported by multimedia terminals. Again, the result is the need to have more than one telephony device on a desktop.

Most users therefore end up with two telephony devices on their desktop. This is inconvenient, owing to the extra desktop space normally required, as well as for the need to have a different telephone number for each device. Callers must therefore keep track of two numbers, and decide in advance which type of call they intend to place.

The recent emergence of the H.323 standard for multimedia communications over packet networks, for example local area networks (LANs) using the Internet Protocol over ethernet, has added further complications for the user, because the multimedia terminal must then connect to the data network, rather than the telephony network. It is well known that the typical data network is not as resilient or reliable as the telephony network. Many H.323 multimedia terminals are PC based, the user rightly fears losing his telephony facility when the LAN or his PC crashes or fails. Therefore, the user still needs more than one telephony device.

SUMMARY OF THE INVENTION

According to a first aspect of the invention, there is provided a method of calibrating a network gateway in order to synchronise audible and visible outputs from a multimedia terminal comprising an audio communication device and a separate video communication device, when the signal to the audio device, and optionally also the signal to the video device, is/are routed through a network gateway that imposes an intrinsic gateway processing delay on at least one signal routed through the gateway, comprising the steps of:

i) providing an audio signal and a video signal;

ii) supplying as an input to the gateway the audio signal and optionally also the video signal so that said signal(s) is/are routed through the gateway to the multimedia terminal;

iii) detecting any mismatch in the synchronisation between the audible and visible outputs from the audio device and the video device owing at least partly to the intrinsic gateway processing delay(s);

iv) adjusting a variable delay in the gateway on a signal routed through the gateway until the audible and visible outputs from the separate devices are effectively synchronised; and v) storing the variable delay in the gateway for future use.

The separate audio and video communication devices may, for example, be a telephone and a video display unit of a personal computer. Alternatively, the multimedia terminal may be formed from the combination of an integrated multimedia terminal having both audio and video capability, but using only the video function, in combination with a separate audio device, for example a telephone.

The audio and video signals may be provided by test instrumentation or may be provided by integrated or separate audio and video communication devices.

Here, the "variable delay" is a delay in the sensory audible and visible output from the separate devices. Equivalently, it may be possible to measure, for example electronically, parameters equivalent to these sensory outputs, for example, digital or analogue signals to a speaker or video display unit. Similarly, for certain combinations of separate audio and video telephony devices, for example, a PBX telephone handset and an H.323 video PC, it may be possible to use digital signalling processing techniques to measure the correlation, or mismatch in correlation of audio and video signals, and also to mathematically calculate the mismatch in synchronisation between audible and visible signals.

Therefore, the term, "detecting any mismatch" includes such electronic detection, digital signal processing, and mathematical calculations as well as a subjective assessment an operator or user of the equipment.

The variable delay may be stored along with information relating to one or both of the devices the audio and video signals are routed to.

A conventional gateway has a number of bi-directional connection points, which act as logical connection points. Each point may therefore act as an input or an output to the gateway, as required.

The audio and video signals may or may not be effectively synchronised with each other prior to at least the audio signal being supplied as an input to the gateway. If the input signals are effectively synchronised, then the main or only component of the variable delay may be due to the gateway's internal intrinsic processing delay. This intrinsic gateway delay may be due, for example, to the need to translate an audio signal, for example a packet switched digital signal, from one standard used for transmission to the gateway input, to a local area network standard for onward transmission from the gateway output.

The term "communication device" is used herein to mean any device, or arrangement of devices, adapted for one or two way communication, that is which may: receive from a source a signal (for example through electrical or fibre optic cable or radio link) and thereby provide to a user a corresponding audible or visible output; and/or receive from a user an audible or visible input and transmit to a destination a corresponding signal.

In a preferred embodiment of the invention, the separate audio and video communication devices are, respectively, an audio telephony device and a separate video telephony device.

Examples of an audio telephony device are a conventional telephone with a handset having a mouthpiece microphone and an ear-piece/speaker, or a separate microphone and speakers connected to a personal computer, for example via a soundboard. Examples of one-way audio telephony devices would be just a microphone or just a speaker. An example of a video telephony device would be a personal computer monitor and video camera connected to the same personal computer. Examples of one-way video telephony devices would be just a camera or just a video display.

Because the audio and video communication devices are not integrated, the audio device may when needed function in its conventional manner without the need to use the video communication device. More importantly, when the audio device connects to the existing audio telephony network, the user still benefits from the services that the network provides. Furthermore, the audio device may be a conventional telephone connecting to the conventional telephony network using the services of that network.

A network gateway enables communication between disparate networks, for example between a LAN and the public switched telephone network (PSTN). Audio signals passing through a gateway are normally transcoded and repackaged between different data encoding standards on the networks on either side of the gateway. This introduces some inevitable delay in the processing of an audio signal through the gateway. Video signals are not normally transcoded, due to the processing requirements of the task. They may, however, be repackaged to accommodate the different nature of the network on each side of the gateway. Even if the networks on either side of the gateway are identical and no transcoding is required, the buffering processing and repackaging requirements of the audio and video signal may be different.

In all cases the result is loss of synchronisation between the audio and video signals. A variable delay may therefore act on one or both of the signals to restore the synchronisation.

Even when the video signal is not routed through the gateway, it may still be the case that a data control signal from the video device is routed through the gateway. Such a data control signal may carry information relating to the video signal, such as data rate or compression standard. In this case, the variable delay need act only on the audio signal passing through the gateway, and not the video signal.

The audio and video signals may become further desynchronised by the transit delay (i.e. propagation delay) between the gateway and the audio device and optionally the transit delay between the gateway and the video device. Usually the audio and video signals will be decoded and buffered in the respective audio and video devices. The total net difference between the audio and video signal delays, including delays through the gateway, is referred to herein as the "synchronisation" delay. The "sensory output" delay is defined as the time difference between the audio and video the user perceives at the terminal. The "sensory output" delay typically consists of several factors.

The variable sensory output delay may be reduced to effectively synchronise the audio and video output by the measurement of the actual delay between the audible and visible output, and then by storing a value corresponding to this variable delay in the gateway so that either the audio signal or the video signal is delayed within the gateway by the appropriate amount.

Because the variable sensory output delay will, in general, depend on the particular characteristics of the audio and video devices, and the path taken by the signals to reach these devices, the gateway will in general need to store a delay value for each possible combination of devices and signal formats to these devices.

Although the audio and video devices are physically separate, resynchronisation of the signals allows the separate audio and video devices to function as a single combined device. The gateway can therefore treat an audio video call set up through the gateway as a call to a single combined logical device, and therefore the separate audio and video devices are referred to herein as a "combined multimedia terminal" or "combination terminal".

Some audio and video devices have the capability to return or "loop back" to the gateway signals received from the gateway or information about the signals. When this is so, and when the signals to and from both separate devices are routed through the gateway, then it is possible to accommodate for a delay (referred to herein as an "intrinsic device transmission" delay, also commonly referred to as "skew") owing to encoding delays within a device prior to onward transmission to the gateway. This may be accomplished after the variable sensory output delay has been set by: looping back the signals from the separate devices to the gateway; then detecting any mismatch in the synchronization between the looped back signals from the separate devices at the gateway owing to the intrinsic device transmission delay(s); then adjusting a delay referred to herein as a variable "device transmission" delay in the gateway so that the looped back signals at the gateway are effectively synchronised; and then storing the variable device transmission delay in the gateway for future use.

Optionally, a synchronisation marker may be provided in the audio and video signals, in which case the detection of any mismatch in the synchronisation between the looped back signals from the separate devices at the gateway owing to the intrinsic device transmission delay(s) includes detecting a mismatch between the synchronisation markers.

Alternatively, when the signals to the audio and video devices may not both be looped back to the gateway, but both pass through the gateway, the intrinsic device transmission delay (owing mainly to the difference in arrival time of the signals at the gateway) on signals transmitted to the gateway may be measured and accommodated, once the variable sensory output delay has been set, by: providing from the audio and video devices, respectively, an audio signal and a video signal; supplying said signals as an input to the gateway so that said signals are routed through the gateway to a second multimedia terminal for which the gateway has already been calibrated according to the method of any preceding claim, the second multimedia terminal comprising a first-calibrated audio communication device and a first-calibrated video communication device; detecting any mismatch in the synchronisation between the audible and visible outputs from the first-calibrated audio device and first-calibrated video device owing to the intrinsic device transmission delays of the audio device and video device; adjusting a variable device transmission delay in the gateway on a signal routed through the gateway until the audible and visible outputs from the first-calibrated audio device and first-calibrated video device are effectively synchronised; and storing the variable device transmission delay in the gateway for future use.

According to a second aspect of the invention, there is provided method of calibrating a network gateway in order to synchronise audible and visible outputs from a multimedia terminal comprising an audio communication device and a separate video communication device, when the signal to the audio device and the signal to the video device are routed through a network gateway that imposes an intrinsic gateway processing delay on at least one signal routed through the gateway, comprising the steps of;

a) providing a first test audio signal with a marker;

b) providing from an integrated audio and video communication device a video signal and a first audio signal sourced from the first test audio signal;

c) providing from a separate audio device a second audio signal sourced from the first test audio signal;

d) supplying as an input to the gateway the first audio signal, the second audio signal ad the video signal so that said signals are routed through the gateway to the multimedia terminal;

e) using the gateway to detect the relative delay between the first audio signal and the second audio signal owing at least partly to the intrinsic gateway processing delay(s);

f) determining a skew delay at the gateway between the first audio signal and the video signal from the integrated audio and video communication device, owing at least partly to the intrinsic gateway processing delay(s);

g) summing said relative delay and the skew delay to generate a variable device transmission delay between the video signal and the second audio signal; and h) storing the variable device transmission delay in the gateway for future use.

Once this variable device transmission delay has been stored in a memory, a second audio test signal with marker can be provided from the gateway, This second audio test signal is transmitted from the gateway to the separate audio device. If an audio coupling is provided between the separate audio device and the audio device of the integrated audio and video communication device, then the second audio test signal can be looped back from the separate audio device through the integrated audio and video communication device to the gateway. It is then possible to determine a first loop back delay in the second audio test signal between the transmission and reception of said signal at the gateway, including any intrinsic gateway processing delay(s). The first loop back delay is then stored in the gateway for future use.

When the loop back delay has been stored in memory, then a third audio test signal with marker can be provided from the gateway together with a video test signal. When these audio and video signals are effectively synchronised, and if the third audio test signal and video test signals are transmitted from the gateway to the integrated audio and video communication device, then an audio coupling provided between the separate audio device and the audio device of the integrated audio and video communication device can be used to loop back the third audio test signal from the integrated audio and video communication device through the separate audio device to the gateway.

Once this is done, then it is possible to determine a second loop back delay in the third audio test signal between the transmission and reception of said signal at the gateway, including any intrinsic gateway processing delay(s), and to store the second loop back delay in the gateway for future use.

Once the second loop back delay has been stored in memory, then a variable sensory output delay can be calculated from a sum of the variable device transmission delay, first loop back delay and second loop back delay. Finally, the result of this sum can be stored as the variable sensory output delay in the gateway for future use.

The invention is therefore in general applicable to the case where the combination multimedia terminal is being formed from (A) an existing integrated audio and video telephony device (to be used for the video telephony part) and from (B) an additional separate audio telephony device. When this is the case, then the integrated terminal's audio capability can be used to calibrate the gateway for the resulting combination terminal. The integrated terminal and the audio device are both connected to the gateway and an audio signal (with markers) is injected into both devices for onward transmission to the gateway. The gateway will apply digital signal processing techniques to detect the relative delay between the two audio paths. Because the skew between the audio and video signals of the integrated terminal is known to the gateway (through normal standards compliant methods) the variable device transmission delay can be calculated by adjusting this skew by the relative audio path delays. Similarly, if an audio signal is first timed by sending the signal to the separate audio device and looping it back via the audio part of the integrated terminal, and then timed by sending it in the reverse direction, that is, to the audio part of the integrated device and looping it back via the separate audio device, the sensory output delay for the combination terminal can be measured.

Furthermore, if the one or both of the telephony devices (audio and video) of the combination multimedia terminal conforms to H.323, then the relative time difference of that device compared to the gateway can be dynamically determined. The intrinsic device transmission delay of that device can then be calculated from the timestamps in the media (audio or video) RTP messages at any point in time. The "base" value of the intrinsic device transmission delay for one or both devices is saved during the calibration of the gateway's variable device transmission delay for this combination terminal. During use, it is now possible to make dynamic adjustments to the variable device transmission delay each time the intrinsic device transmission delay for one or both devices is measured.

This calculation provides an alternate means of determining the round-trip delay.

Therefore, once the calibration of the gateway is achieved, then if the multimedia terminal is to be in audio and video communication with an H.323 compliant multimedia terminal, the gateway can determine a relative time difference between itself and the H.323 compliant multimedia terminal in order to increase or decrease a device transmission delay of the H.323 complaint multimedia terminal in order to synchronise the audible and visible outputs from the multimedia terminal.

Also, if the combination multimedia terminal is formed from an integrated H.323 terminal combined with a separate audio telephony device, it is possible to send dummy audio with the video to the integrated device, to force the video to be delayed in a controlled manner because typically the integrated device is trying to synchronise the audio and video. This is achieved by adjusting the time-stamps in the audio and video media messages sent to the terminal. The gateway now increases the variable sensory output delay as applied to the audio that is sent to the separate audio telephony device such that real audio, dummy audio and real video are synchronised sensory outputs.

Also according to the invention there is provided a multimedia communication system, comprising a network gateway and one or more multimedia terminal(s), each terminal comprising an audio communication device and a separate video communication device, wherein the gateway has an input for receiving a signal from the audio device, and optionally also an input for receiving a signal from the video device so that said signal(s) may be routed through the gateway, characterised in that the network gateway has been calibrated according to the method of any preceding claim in order to synchronise audible and visible outputs from, respectively, the audio device and video device.

BRIEF DESCRIPTION OF THE DRAWING

The invention will now be described by way of example, with reference to the accompanying drawings, in which.

DETAILED DESCRIPTION OF THE INVENTION

Figure 1:
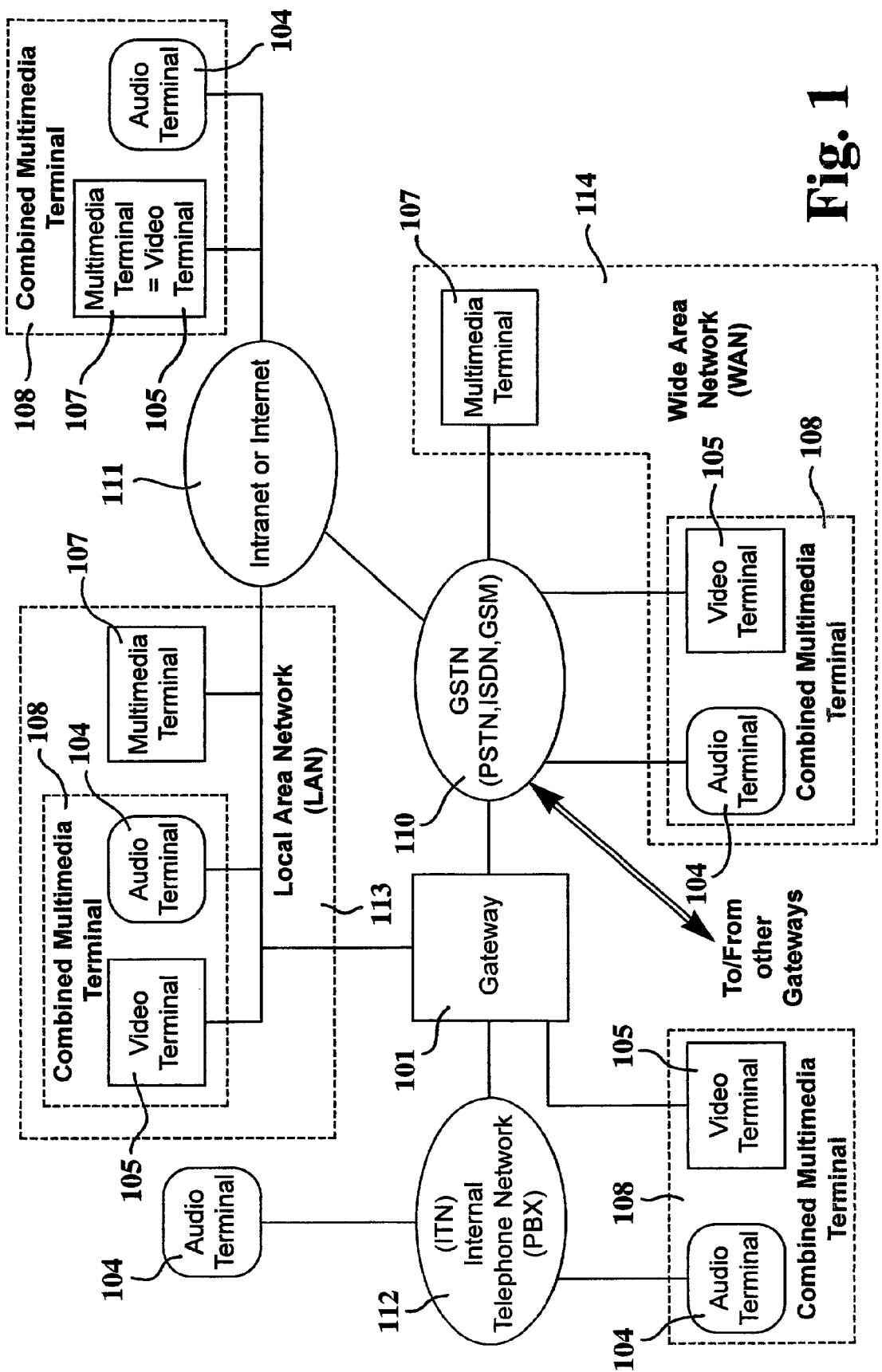
FIG. 1 is a schematic drawing of a gateway system according to a first aspect of the invention comprising a gateway connected to various telephony devices, including combined multimedia terminals via a number of networks.

The gateway system of FIG. 1 includes a gateway 101 and interconnects devices on various disparate networks such as: the global switched telephone network (GSTN) 110; an enterprise's local area network (LAN) 113 or intranet and/or the internet 111; an enterprise's internal telephony network (ITN) 112, for example a PBX exchange; and other terminals on a wide area network (WAN) 114. Note that the connection of the gateway 101 to the internal telephony network 112, to the LAN 113 and the WAN 114, may be direct as shown or via the GSTN 110 (not shown).

Some of the devices may be integrated multimedia terminals 107, with at least some being combined multimedia terminals 108, each with an audio terminal 104, for example a conventional telephone, and each with a video terminal 105 for example a personal computer (PC), monitor, and video camera. In FIG. 1, one combined multimedia terminal 108 includes an audio terminal 104 in combination with an integrated multimedia terminal 107 which provides the function only of a video terminal 105.

By setting up a multimedia call through the gateway 101 and having as minimum the audio stream passing through the gateway it is possible to synchronise the video and audio for various types of multimedia terminals connected to these networks 110,111,112,113,114 even those that do not have integrated audio and video devices.

According to International Telecommunications Union (ITU) recommendation H.246, gateways provide protocol interworking between H-series multimedia terminals and other H-series multimedia terminals and voice/voice band terminals on the GSTN and ISDN, V.70 terminals on the GSTN and multi-call applications on the GSTN. H.246 gateways provide the required translation of control and media streams to allow interworking between terminals running different protocols. The common protocols for H-series multimedia terminals are:

| | |
|---|---|
| H.310 | (Broadband audio-visual communication systems and terminals - ATM); |
| H.321 | (Adaptation of H.320 visual telephone terminals to B-ISDN environments - ATM); |
| H.320 | (Narrow-band visual telephone systems and terminal equipment - ISDN); |
| H.323 | (Visual telephone systems and equipment for local area networks which provide a non-guaranteed quality of service - packet based); and |
| H.324 | (Terminal for low bit rate Multimedia Communication - PSTN, ISDN and Mobile). |

A less used protocol is H.322 (Visual telephone systems and terminal equipment for local area networks which provide a guaranteed quality of service).

For the purposes of the present invention multimedia terminals are distinguished by the media stream multiplex standard to which they conform of which there are four—H.221 (H.320), H.222.0 (H.310, H.321—Note H.222.1 is a subset of H.222.0), H.223 (H.324) and H.225/0 (H.323). A video terminal will still use a multiplex standard even though one media element is missing. An audio terminal may use a multiplex standard but not if it is a conventional phone device.

Terminals participating in multimedia communications use a variety of audio and video coding algorithms to produce a digital signal according to the ITU standards for these terminals. Video is encoded following the ITU standards H.261, H.262 and H.263, whilst audio can be encoded following ITU standards G.711, G.728, G.722, G.723 and G.729. Normal analogue and mobile telephony is also encoded to G.711 when being transported through the fixed telecommunications network 110. Though these algorithms are prevalent today in multimedia communications, the present invention is applicable to future or alternative algorithms. For example, it is quite possible for a gateway 101 to transcode an audio signal to GSM for radio transmission to a mobile handset if it were being used as the audio device in a multimedia call.

Different compression and encoding algorithms for audio and video delay the transmission of the signal by different amounts. The same algorithm from different manufacturers may also delay the signal differently. Video encoding takes longer than audio encoding resulting in a loss of synchronisation commonly known as skew, but herein referred to as the misalignment due to intrinsic device transmission delay(s). Video encoding delays also vary according to the frame/transmission rate. The encoded signal may be buffered at some processing point or suffer from other network propagation delays (congestion on a LAN, for example). The signal may need to be transcoded at some intermediary processing point, usually the gateway, because endpoints such as multimedia terminals generally do not have the same audio and/or video capabilities. The transcoding of a media signal adds further delay to that signal. Onward transmission delays, decoding and jitter buffer delays and of course a wide range in terminal performance further compounds the problem of synchronising the audio and video. Studies carried out by the TV industry suggest that video may be delayed over the audio by 10 ms±30 ms (i.e. the video can be up to 20 ms in advance of the audio or up to 40 ms behind the audio) before the loss of lip-synch becomes annoying.

Thus the gateway's most important function is to transcode media and control signals whilst maintaining synchronisation of the audio and video streams and keeping the overall communications delay to a minimum. In the present invention, these functions are extended in the gateway to logically combine a telephony terminal on one network with a video terminal on another (or the same) network so as to appear as a single H-series multimedia terminal. For example, an enterprise user may use his PBX or DECT mobile handset as the audio device and his LAN PC (equipped with camera, video capture module and video codec) as the video and data device in a multimedia call.

Alternatively, a home user may use his mobile phone as the audio device and his "Video Set-Top" box, TV and camcorder connected to the public switched telephone network (PSTN), as his video device.

However, when terminals are combined together in this way to form a logical multimedia terminal, the normal mechanisms prescribed within the standards to maintain lip-synch no longer apply. It is therefore necessary to deal with several types of delay.

One type of delay stems from network propagation and decoding delays for receiving combination terminals. Included in this delay is a transcoding delay in the gateway for at least the audio stream. Once this has been determined, one of the media streams (usually the audio) is delayed in the gateway to attempt to provide synchronisation.

It is envisaged that gateway 101 is a "local" gateway in the sense that network propagation delays are predictable, rather than a non-local gateway, for example in another country. In such a case, it would be normal for the local gateway to be connected directly to the non-local gateway, as shown in FIG. 1.

Another source of delay is the audio/video skew arising from intrinsic device transmission delays of the transmitting combination terminals. Once this has been determined, a stream (usually the audio) is delayed in the gateway to attempt to reduce the skew to zero. With an integrated multimedia terminal such as those conforming to the H.323 and H.324 standards, it would be possible to report the skew to the receiving terminal so it can make the adjustment itself. For a combination terminal, no such report can be made by the transmitting device, and so this must be determined by the gateway.

Some network propagation delays may change or vary over time, and therefore it may be desirable also to determine variations in these delays, and continually adjust the skew and variable sensory output delays accordingly. However, network propagation delays may be assumed to be constant during a call as users can cope with minor blips in synchronisation.

Figure 2:
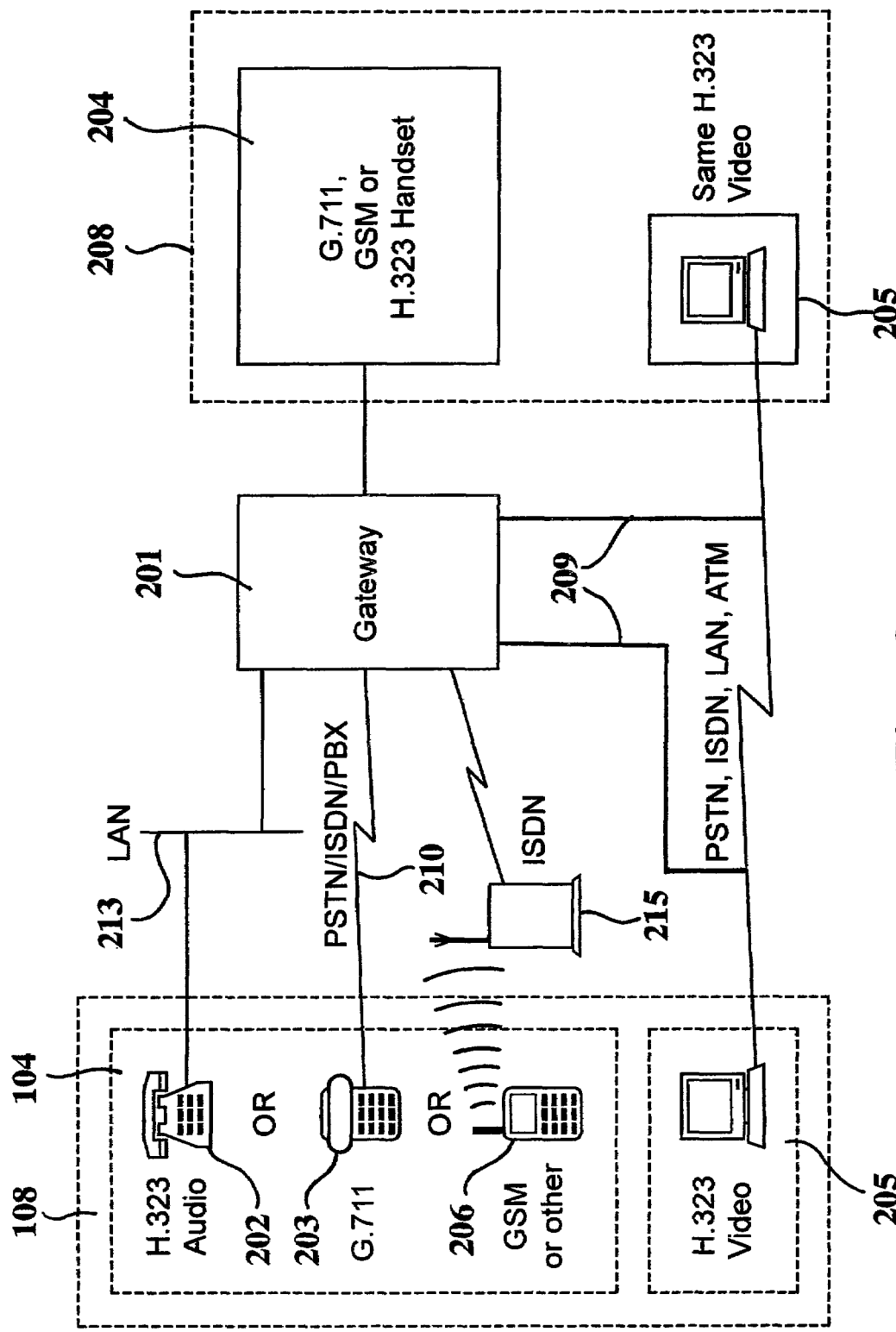
FIG. 2 is a schematic drawing of a gateway system such as that in FIG. 1, in which the video signal to and from a combined multimedia terminal bypasses the gateway.
Figure 3:
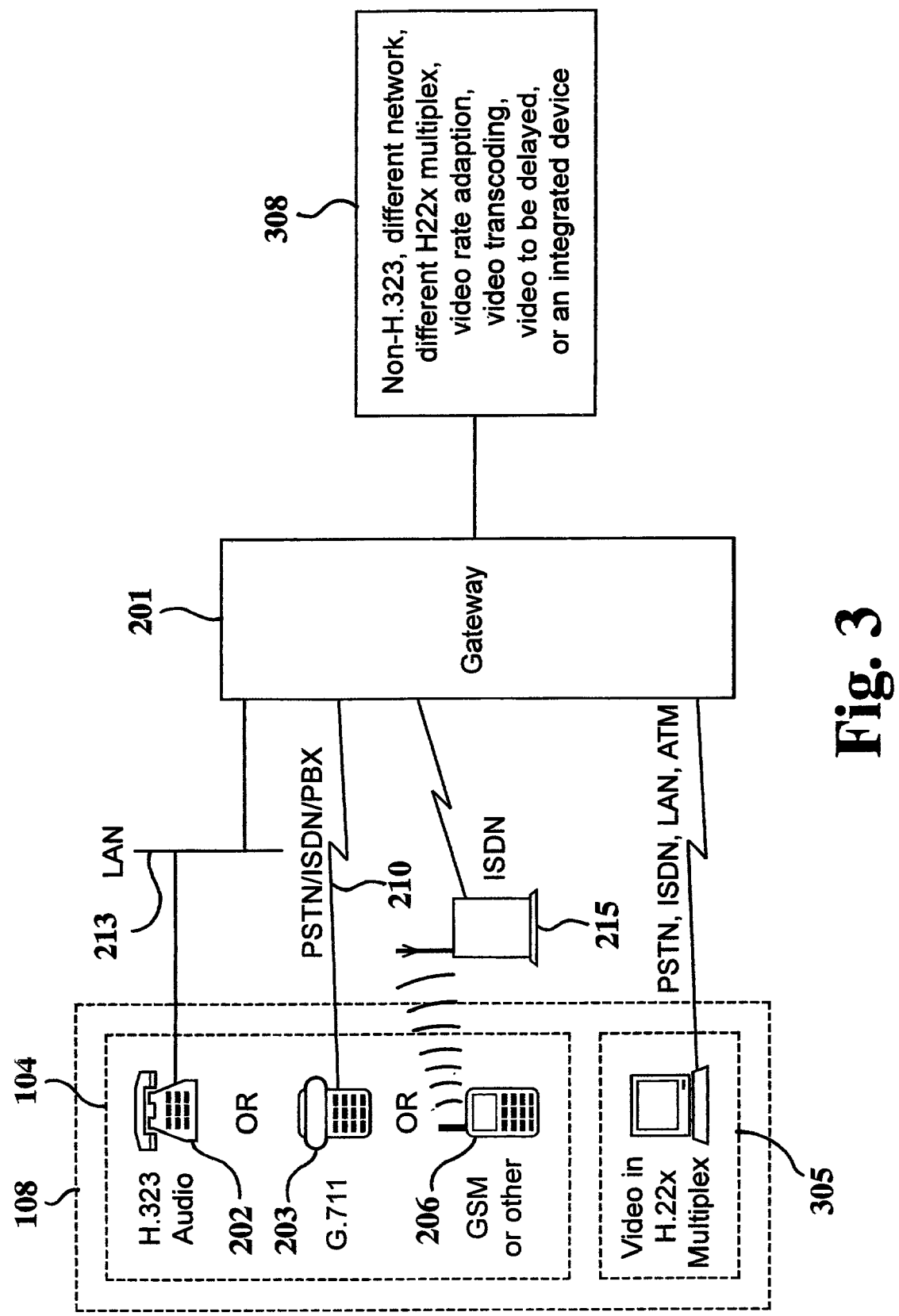
FIG. 3 is a schematic drawing of a gateway system such as that in FIG. 1, in which both the audio and video signals pass through the gateway.

Despite the multiplicity of standards, there are a limited number of ways that are practical in which audio and video devices are likely to be associated together to form combination terminals. FIGS. 2 and 3 illustrate those common associations. FIGS. 2 and 3 show a number of audio terminals 202,203,206 that may be connected through a gateway 201 to another such audio device 204 or a multimedia terminal 208,308. Examples of suitable audio devices include: a new type of H.323 compliant telephone 202 connected to a LAN 213; a G.711 compliant telephone 203 connected via PSTN/ISDN/PBX 210; and a mobile GSM telephone 206 connected via a mobile network 215. It is unlikely that users will want to have an H.320, H.324, H.310 etc. audio only terminal supported. Any one of the three audio device types may be combined with a video terminal 205,305 that will send its video in a multiplex signal conforming to H.22x. If a call is placed between two combination terminals whose video devices are of the same standard, and the overall audio delay is less than or equal to the video delay, then it is not necessary for the video part of the call to go via the gateway 201, as shown in FIG. 2, provided the gateway 201 receives control or data signals 209 from the video devices to know when and in what mode they are operating. Of the standards compliant terminals, to date only H.323 terminals have separate video and control data signals and, therefore, fall into this category. In all other cases, the video device 305 must be connected to the gateway 201 so that both the video and audio calls go via the gateway 201, as shown in FIG. 3. For example, if one of the terminals 308 in the call is an integrated H.320 multimedia terminal, then the audio, video and control signals must take the same path between the gateway 201 and the H.320 terminal 308. In communicating with the integrated terminal 308, the gateway is responsible for multiplexing and de-multiplexing (according to H.221) audio, video and control signals to/from the H.320 terminal 308. Therefore, the gateway 201 must also receive and send video and control signals to and from the video device 305 of the combination multimedia terminal. Furthermore, in any call, if video is being transcoded (e.g. from H.263 to H.261) or processed in any way (e.g. rate adapted or delayed) by the gateway 201, the video signals to/from the video device 305 of the combination multimedia terminal must pass through the gateway 201.

As terminal and device characteristics vary so much, an important part of the process of the present invention is to determine delays between audio and video signals and thereby calibrate the gateway before it can be used to present synchronised audio and video.

In order for a device to make use of the present invention, the gateway must acquire a number of details about the device. Some of these details are static, that is, known in advance and are entered during a initial registration, for example on-line entry of a devices details into a table or database; some are determined through a gateway calibration process; some are determined during an initialisation process, for example in which H.323 devices communicate with the gatekeeper part of the gateway; and some are calculated and updated regularly, for example owing to propagation delays that may change with time.

A new device is first registered with the gateway by entering, for example either manually by an operator at the gateway, or on-line by the user, details that include:

A) A device name or unique identifier by which the device is to be further referenced.

B) The type of device, which could be an audio only device, a video only device, a video and data device or an integrated multimedia terminal.

C) The model of the device. Devices of the same model, standard and network will normally have identical characteristics and need not be calibrated more than once.

D) The cross-reference name or identifier of the device with which this one combines to form a logical multimedia terminal. Fully integrated multimedia terminals may leave this field blank if they do not combine with any other device.

E) The type of network to which the device attaches, for example PSTN, ISDN, GSM, DECT or LAN.

F) The address of the device on that network. This could be an E.164 telephone number for GSTN and PBX terminal. If a LAN device does not have a static address (as in the case of dynamically assigned IP addresses) then the H.323 alias address is used.

G) The standard(s) for the media types that the terminal supports, for example H.3xx, G.711, GSM or CDMA.

H) Known calibration details for the given combined terminal. If an existing pair of devices is already supported by the gateway, then that pair does not need to be calibrated, and the known variable sensory output delay and variable device transmission delay can be entered.

Therefore, only new combinations of audio and video devices on different networks will need calibration. If the delays are not known for the particular combination of network and devices, the details that need to be determined during calibration include:

I) Variable sensory output delay outbound from the gateway that must be applied to the audio signal in order to maintain lip-synch. (Note that a negative value indicates the video is delayed).

J) The transmitted (from the gateway) video In Transit (i.e. Propagation) Delay when the variable sensory output delay is determined. This only applies to video that is being transmitted on networks that might have a wide range of transmission delays such as LANs.

K) The transmitted (from the gateway) audio In Transit (i.e. Propagation) Delay when the variable sensory output delay is determined. This only applies to audio that is being transmitted on networks that might have a wide range of transmission delays such as LANs.

L) The audio/video device transmission delay (also referred to as skew), which is how much the audio is in advance of the video.

M) The received (to the gateway) video In Transit Delay when the audio/video device transmission delay (i.e. skew) is determined. This only applies to video that is being received on networks that might have a wide range of transmission delays such as LANs.

N) The received (to the gateway) audio In Transit Delay when the audio/video device transmission delay (i.e. skew) is determined. This only applies to audio that is being received on networks that might have a wide range of transmission delays such as LANs.

The details that need to be determined during the development of the gateway include:

O) Transcoding Delays

P) Signal Buffering and Processing Delays

Figure 4:
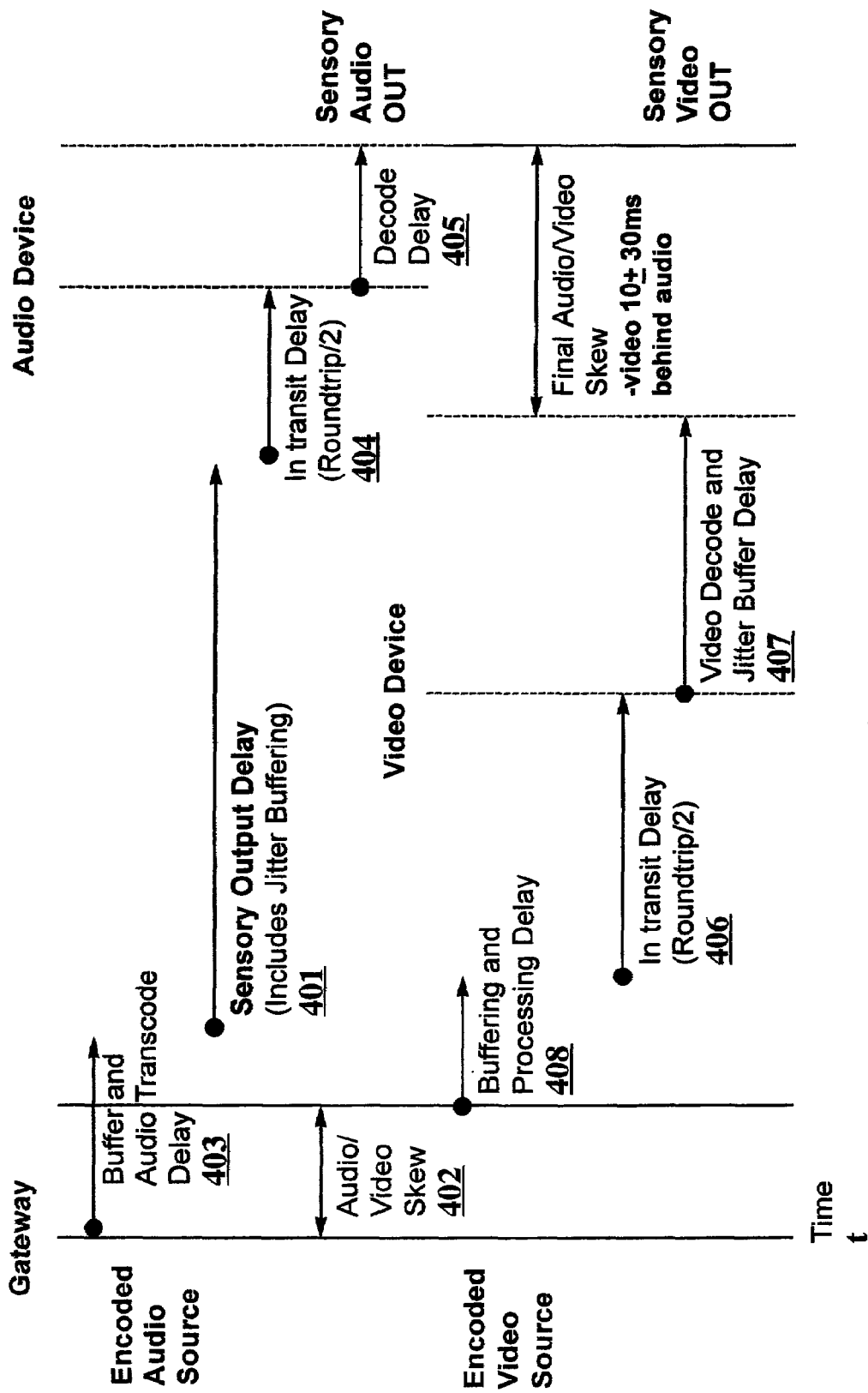
FIG. 4 is a schematic time line drawing showing how a variable sensory output delay in the gateway may be determined and stored in the gateway in order to synchronise the audible and visible outputs from a combined multimedia terminal.
Figure 5:
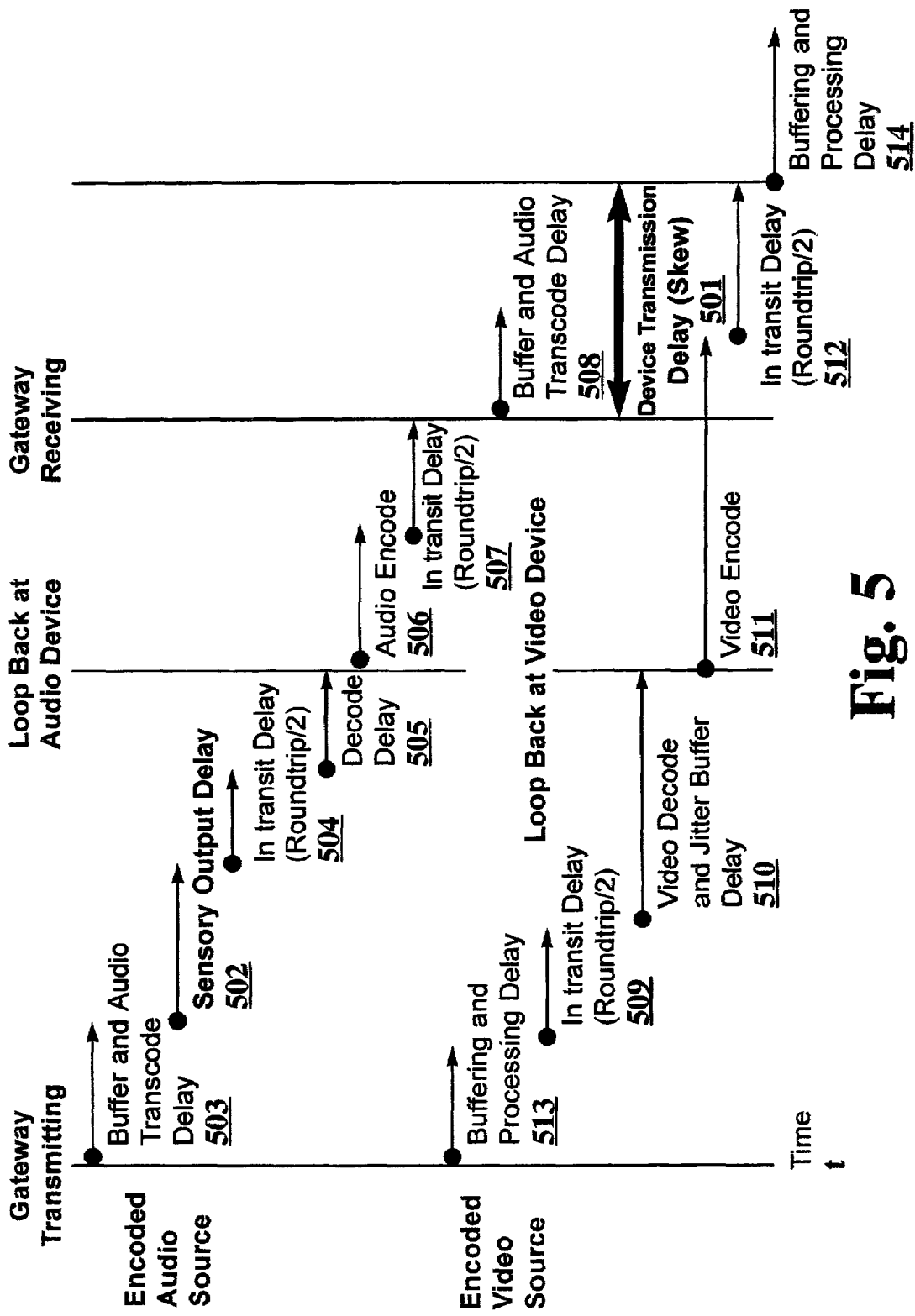
FIG. 5 is a time line drawing showing how an intrinsic delay between audio and video signals looped back to the gateway from the combined multimedia terminal may be determined and stored in the gateway (as a variable device transmission delay) in order to synchronise the audible and visible outputs looped back from the combined multimedia terminal.
Figure 6:
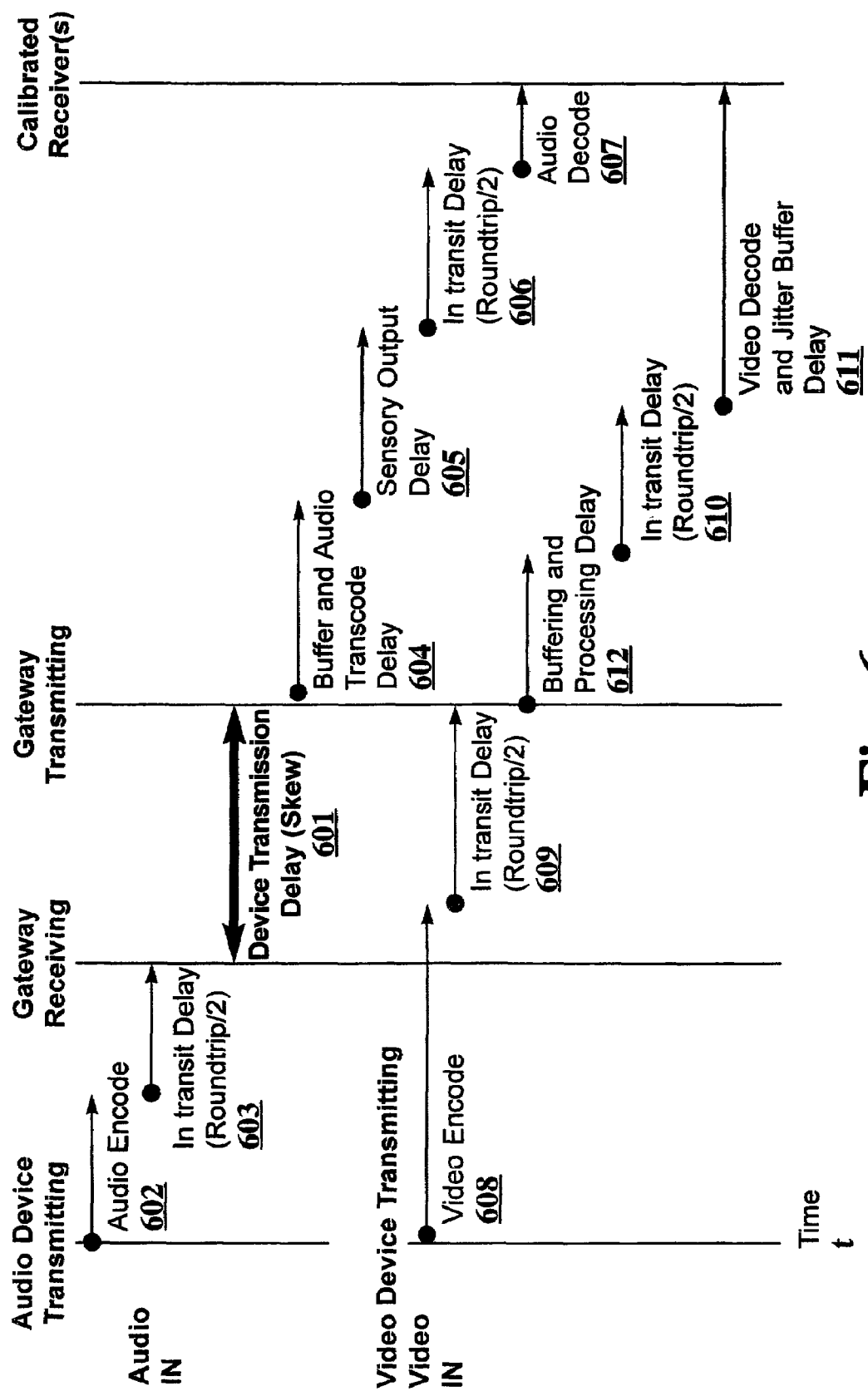
FIG. 6 is a time line drawing showing how an intrinsic delay between audio and video signals returned, but not looped back, from the gateway to a previously calibrated multimedia terminal may be determined and stored in the gateway (as a variable device transmission delay) in order to synchronise the audible and visible outputs from the combined multimedia terminal.

FIGS. 4, 5 and 6 depict a calibration process that is used to determine the audio/video device transmission delay (i.e. skew) and the sensory output delay characteristics of the audio and video devices that are being combined together as a logical multimedia terminal. If either or both of those devices reside on networks that have a range of network transmission delays then the roundtrip time is also measured during the calibration process.

This calibration process is repeated for each different combination of codec variant and transmission/reception rates the combined terminal supports. For example an H.323 audio only LAN telephone may support the ITU-T Recommendation G.723.1 at 6.4 kb/s and 5.3 kb/s. The LAN telephone's associated video terminal may support H.263 at 15 fps (frames per second) and 30 fps. In this case four sub-table entries in each device table are required—one for G.723.1 at 6.4 kb/s with H.263 at 15 fps, one for G.723.1 at 6.4 kb/s with H.263 at 30 fps, one for G.723.1 at 5.3 kb/s with H.263 at 15 fps and one for G.723.1 at 5.3 kb/s with H.263 at 30 fps. Different skew and variable sensory output delays are needed for each combination. It may also be necessary to take into account not only the video frame rate but also its compressed data rate.

The variable sensory output delay 401, as illustrated in FIG. 4, is first calibrated. The illustration shows only the audio being transcoded 403 as this is the most common case. Transcoding of video may be practical if it does not incur a delay so large that it makes communication unintelligible.

The process is conducted as follows. First, an audio/video call is set up from the combination terminal to the gateway in order to conduct the synchronisation calibration process (special number(s) may be dialled).

Then, the synchronisation process plays back a recorded audio/video clip with known audio video skew 402. In the simplest case, it may be 0 ms, which is to say that the audio and video are synchronised to start with.

The delay in transcoding the audio 403 will have been pre-determined during development of the gateway. It will be a constant value. The same applies to any video processing (e.g. because of transcoding) and buffering delay 408.

Control messages, for example DTMF tones manually entered from a telephone key pad, are sent to the gateway to set a variable sensory output delay 401 on the audio stream in the gateway until lip-synch is observed. If the delay is negative, the video signal must be delayed 408, implying video must also pass through the gateway. The delay value is then stored in the gateway. The sensory output delay 401 takes into account the variance in the audio and video devices' own decode and buffering delays, 405 and 407 respectively.

If either the audio or video device is situated on a network that has varying network propagation delays, the gateway calculates half the average roundtrip delay 404 and/or 406. This only applies to packet based LAN terminals supporting H.245 so the H.245 so-called "Roundtrip Delay" message may be used for this purpose. The transit delay is then stored in the gateway.

The delay added to any signal due to buffering a signal on receive 403 and transmit 408 will be predetermined during development of the gateway so that if the video signal is sent directly without passing through the gateway, the audio signal's delay can be adjusted accordingly (i.e. by subtracting the delay 408) to maintain overall synchronisation.

Once the sensory output delay 401 is known, the combination terminals transmit skew is calibrated. FIGS. 5 and 6 illustrate two ways of performing the skew calibration process. Again, no video transcoding is shown for simplicity.

FIG. 5 depicts the case where the video device supports a loop back facility at the analogue interface i.e. the video signal is decoded then re-encoded. Most audio devices do not support this loop back facility so a coupling of the audio receive and transmit signals to provide a loop back is made. The steps involved in this process are as follows:

First, an audio/video call is made to the combination terminal, the terminal capabilities (combination of audio and video codec variant/rates) are set and the video loop back is set on.

At some later time, the gateway plays-back encoded audio and video signals containing timing markers in each signal. Skew between audio and video signal at this point is zero.

The video stream (if not transcoded) is transmitted 513 to the video device of the combination terminal. Meanwhile the audio signal is transcoded 503. The delay injected to the signal by this process is known having been determined during development of the gateway.

The sensory output delay 502 as previously calibrated is added by the gateway to the audio stream, and the audio stream is transmitted to the audio device of the combination terminal.

The audio and video signals arrive at the separate audio and video devices and are decoded, respectively 505 and 510. The decoded signals are looped back at the analogue interfaces of the audio and video devices, re-encoded 506, 511 and sent back to the gateway. The gateway detects the audio marker and starts an internal skew timer.

The gateway then detects the video marker after processing the video and stops the skew timer. The value of the skew timer minus the video processing delay 514 plus the extra audio transcode delay 508 (needed to detect the audio marker) is the skew 501. This delay is then stored in the gateway as a variable device transmission delay in order to compensate for skew. Note that the skew 501 takes into account the variance in processing at each of the separate audio and video devices, respectively 505 and 506 at the audio device and 510 and 511 at the video device.

If either the audio or video device is situated on a network that has varying network transmission delays, the gateway calculates half the average roundtrip delay 504 (equals looped-back half roundtrip delay 507) and/or 509 (equals looped-back half roundtrip delay 512). This only applies to packet based LAN terminals supporting H.245 so the H.245 Roundtrip Delay message may be used for this purpose. The transmission delay is then stored in the gateway for future use as a variable device transmission delay.

FIG. 6 depicts the calibration process where no loop back facility is available at the audio and video devices. In this case a specially prepared audio/video signal is input at the audio and video devices (e.g. via auxiliary inputs). The steps involved in this process are as follows.

First, an audio/video call is set up from the audio and video devices of the combination terminal to be calibrated, through the gateway to a calibrated receiver used in place of an actual combination or integrated terminal.

The encoded audio 602 is received by the gateway. In this process, a variable device transmission delay 601 will be added to the audio signal to compensate for the skew.

The audio is transcoded 604 at the gateway. The delay injected to the signal by this process is known having been determined during development of the gateway. Similarly, the video is buffered and processed 612 in the gateway and the delay this incurs will also have been determined during the development of the gateway.

The audio will then be delayed by the previously determined sensory output delay 605 of the calibrated receiver before being transmitted. This delay may be adjusted according to roundtrip delays 606 and 610, if these are significant. Note that the sensory output delay compensates for the variance in the receiver's audio and video decode and processing delays, respectively 607 and 611.

Meanwhile the gateway and calibrated receiver are also receiving the encoded video 608.

Control messages such as DTMF tones may then be sent manually from the calibrated receiver (for example from a keypad which is part of an audio device of the receiver) to delay the audio skew 601 until lip-synch is observed. If the delay is negative, the video signal must be delayed implying video must also pass through the gateway. The delay value is stored in the gateway for future use as a variable device transmission delay.

If either the audio or video device is situated on a network that has varying network transmission delays, the gateway calculates half the average roundtrip delay 603 and/or 609. This only applies to packet based LAN terminals supporting H.245 so the H.245 Roundtrip Delay message may be used for this purpose. The transmission delay is stored in the gateway for future use.

The majority of multimedia terminals manufactured will be integrated devices, that is, they will have both audio and video capability with integrated circuitry and/or software to effectively synchronise the sensory output of the audio and video signals. It is possible to use this capability during calibration of the network gateway so that an alternative separate audio telephony device replaces the audio part of the integrated terminal. Indeed, the user need not install the audio telephony part of the integrated terminal (or even purchase it, if it is sold separately such as sound cards, headsets and speakers are). Even if the audio telephony component of the integrated multimedia terminal cannot be de-coupled, it can still be used in a combination multimedia terminal configuration with a different audio telephony device. During use, the gateway will simply mute the audio streams to/from the audio part of the integrated terminal.

Figure 7:
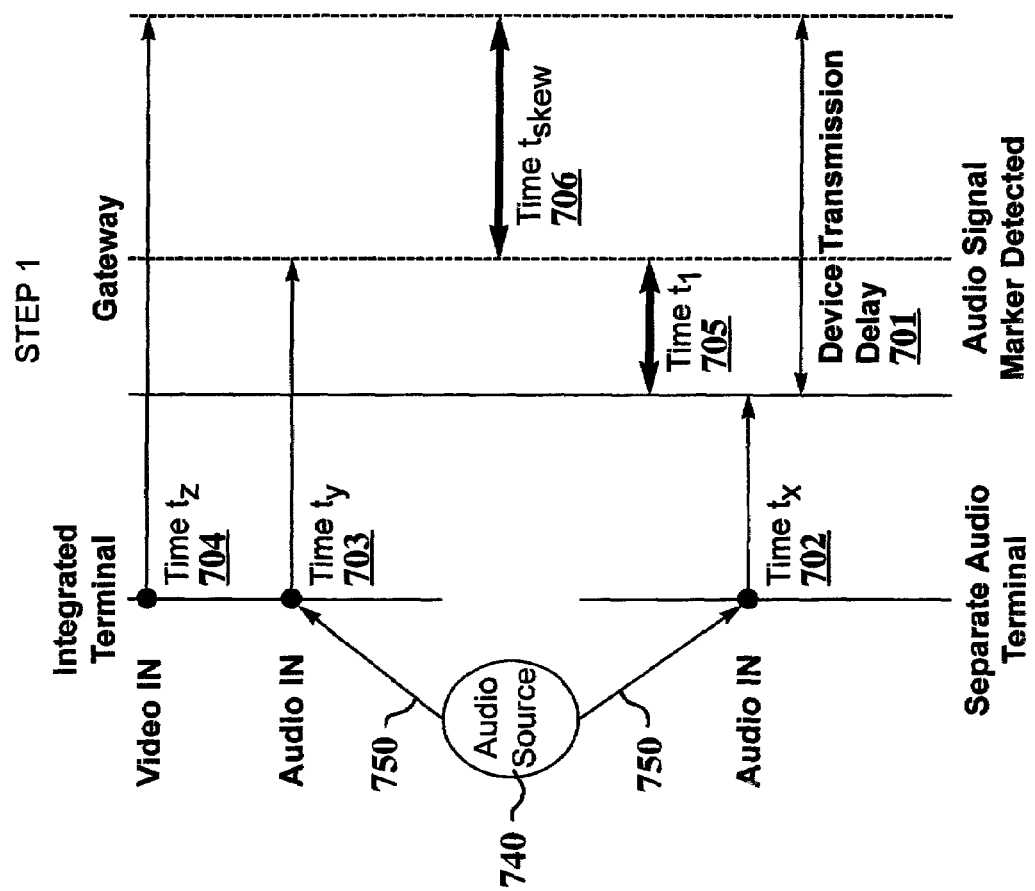
FIG. 7 is a schematic drawing time line drawing of a gateway system according to a second aspect of the invention, showing how the variable device transmission delay may be calculated when the combination multimedia terminal comprises of an integrated multimedia terminal (with both audio and video capability) and a separate audio telephony device.
Figure 8:
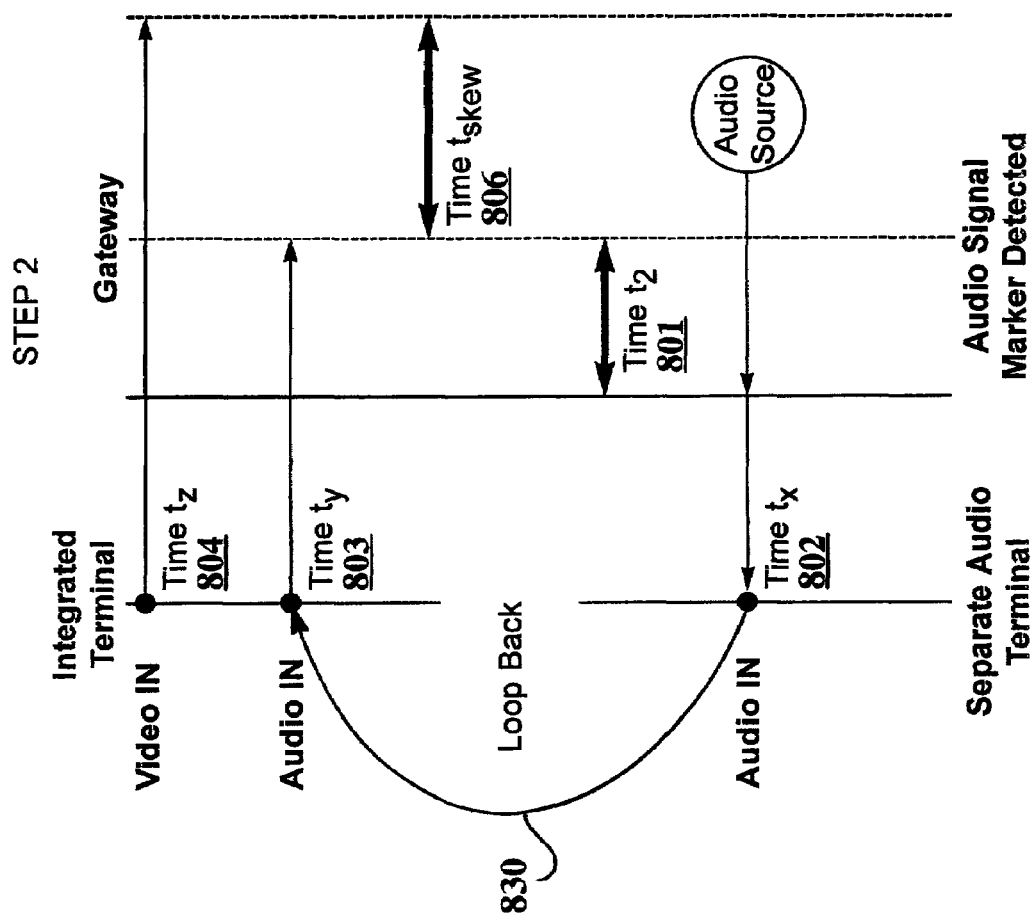
FIGS. 8 and 9 are time line drawings following on from FIG. 7, showing the additional measurements needed to calculate the variable sensory output delay when the combination multimedia terminal comprises of an integrated multimedia terminal (with both audio and video capability) and a separate audio telephony device.
Figure 9:
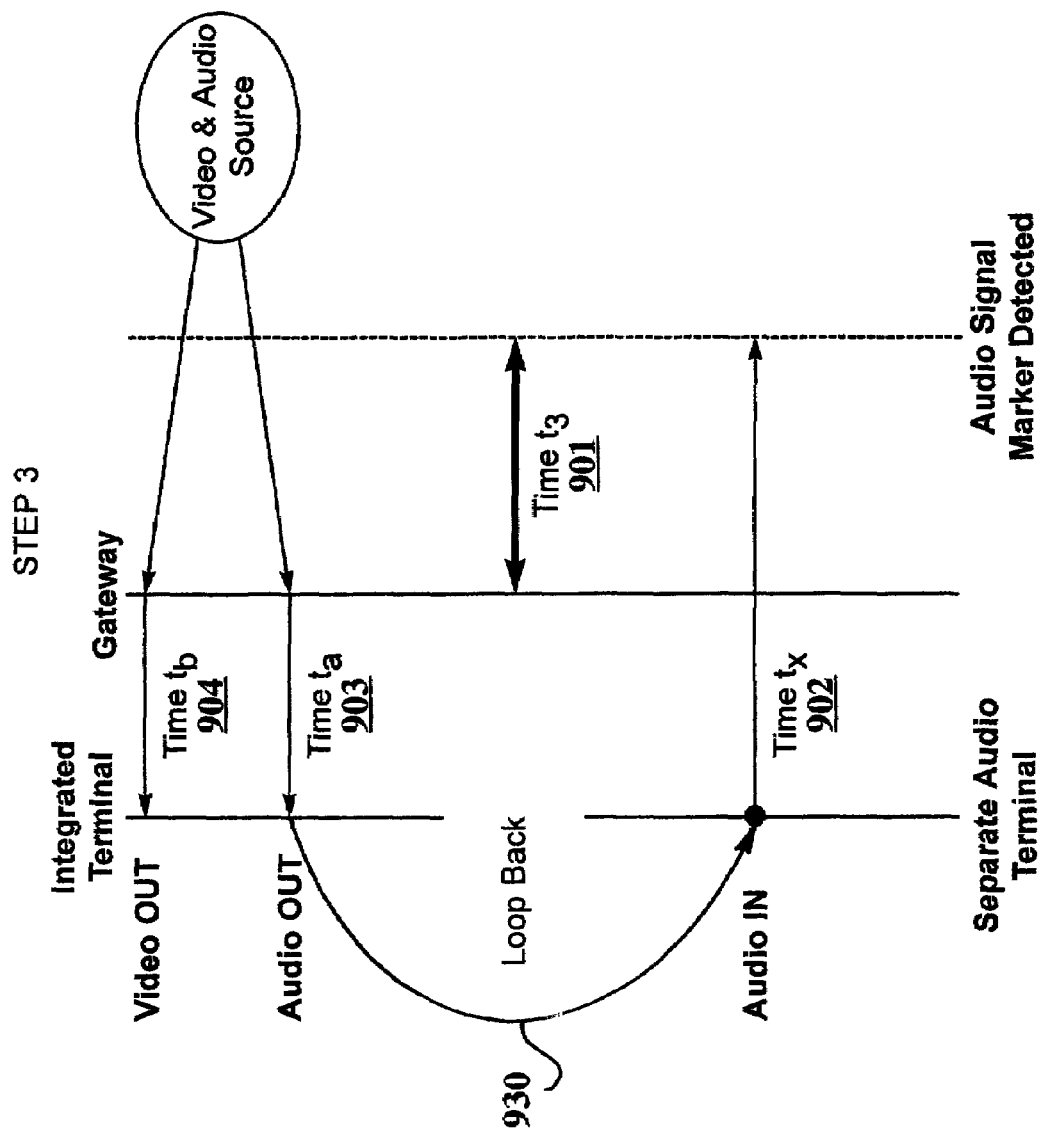

A second aspect of the invention is shown in FIGS. 7, 8 and 9, making use of the capabilities of an integrated multimedia terminal. Here, the gateway is calibrated to support an integrated multimedia terminal and a separate audio telephony device in a combination multimedia terminal configuration. The complete calibration takes three steps as shown in FIGS. 7, 8 and 9, as follows.

An audio-video telephony call is set up from the integrated terminal through the gateway, and an audio telephony call is established from the separate audio telephony device through the gateway.

In Step 1 (FIG. 7) the variable device transmission delay 701 is calculated by injecting from an audio source 740 an audio signal 750, complete with marker signal, that is sent to the gateway along both audio paths. The gateway detects the marker signals at time $t_x$ 702 and $t_y$ 703 and calculates the time difference on their arrival, say time $t_1$ 705. Note that the signal is detected after buffering and transcoding of the audio signal (if necessary), and of the processing time taken that is known during development of the gateway as described previously. The difference between the arrival of the video $t_z$ 704 and the arrival of the audio $t_y$ 703 is know as the skew, $t_{skew}$ 706. The skew $t_{skew}$ 706 from the integrated terminal is known from standard techniques for that type of terminal. Therefore, the variable device transmission delay is known to be $t_{skew}$ 706+$t_1$ 705.

In Step 2 (FIG. 8), an audio signal with marker is sent from the gateway to the separate audio telephony device and looped back 830 to the gateway via the audio path of the integrated terminal during the multimedia call. The gateway times the receipt of the audio signal marker between its dispatch and receipt, say time $t_2$ 801. For the purposes of this measurement it can be assumed that $t_x$ 702 is identical to $t_x$ 802 and the loop back time of the audio signal is zero. (note that the other pairs of times, $t_y$ 703 and 803, $t_z$ 704 and 804, $t_{skew}$ 706 and 806 are the same).

In Step 3 (FIG. 9), synchronised audio and video are sent to the integrated terminal. The delay the audio and video signals takes to arrive and be decoded by the integrated terminal is time $t_a$ 903 and time $t_b$ 904 respectively. As the terminal plays out synchronised audio and video time $t_b$ 904 is effectively the same as $t_a$ 903 (within 10±30 ms). At some point the audio will contain a marker signal that is looped back 930 to the separate audio device to return it to the gateway. The gateway times the audio signal marker between its dispatch and receipt, say time $t_3$ 901. For the purposes of this measurement it can be assumed that $t_x$ 902 is identical to $t_x$ 702 and 802 and the loop back time of the audio signal is zero.

From these three steps the following can be deduced:
1. Variable device transmission delay=$t_1$+$t_{skew}$
2. $t_y$−$t_x$=$t_1$
3. $t_y$+$t_x$=$t_2$
4. Therefore: $2t_x$=$t_2$−$t_1$
5. Variable sensory output delay=$t_a$−$t_x$
6. But $t_3$=$t_a$+$t_x$
7. Therefore: Variable sensory output delay=$t_3$−$t_2$+$t_1$ or Variable sensory output delay=$t_3$−$t_2$+$t_1$ Once the gateway has been calibrated for the devices of a particular combination terminal on a particular network, it will generally not be necessary to recalibrate the devices. In some circumstances, certain delays, such as propagation delays, may be variable, in which case the combination terminal may be re-calibrated "on the fly" for that call. This may be initiated by a user, for example by keying in a code on a telephone keypad, or by using DTMF tones to vary the variable sensory output delay until an acceptable level of lip-synch is observed by the user.

Figure 10:
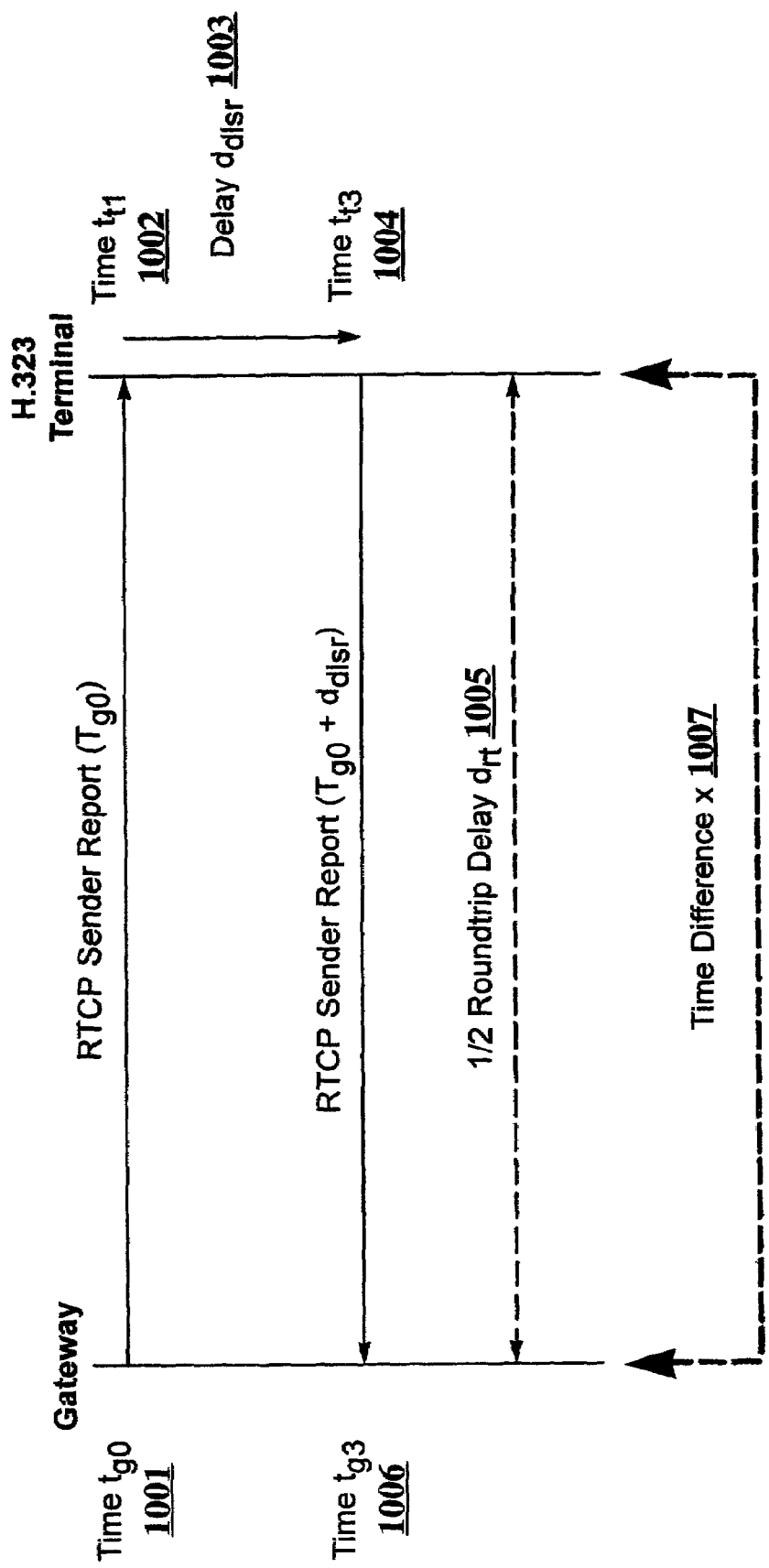
FIG. 10 is a time line drawing following on from FIGS. 7, 8 and 9, showing the measurements and messages necessary to dynamically calculate (1) the round-trip and (2) the time reference difference between a network gateway and an H.323 terminal so that the variable device transmission delay may be dynamically adjusted during use.

The variable which has most effect on the synchronisation process is the intrinsic device transmission delay, particularly for the video element. Now if one or both of the telephony devices (audio and video) of the combination multimedia terminal conforms to H.323, then it is possible to accurately calculate the intrinsic device transmission delay by determining the time difference of the terminal relative to the gateway. FIG. 10 shows the exchange of messages between the gateway and the H.323 terminal necessary to acquire the information needed to perform the calculation.

At time $t_{g0}$ 1001 in the gateway, the gateway sends an RTCP SR packet which contains the value $t_{g0}$ as a parameter. At time $t_{t1}$ 1002 in the terminal, the terminal receives the above SR packet. At some time later in the terminal, $t_{t2}$ 1004, the terminal sends its RTCP SR packet which contains its RTCP RR packet about the media sent from the gateway. This RR packet contains the parameters LSR (Last Sender Report)=$t_{g0}$ 1001 and $d_{DLSR}$ 1003 (Delay between Receiving the Last Sender Report and Sending this SR packet)=$t_{t2}$−$t_{t1}$. At time $t_{g3}$ 1006 in the gateway the SR packet is received.

Now at the gateway:

round trip delay=$t_{g3}$−$t_{g1}$−$d_{dlsr}$ but $d_{lsr}$=$t_{t2}$−$t_{t1}$.

So the estimated one-way delay d 1005=½($t_{g3}$−$t_{g0}$−($t_{t2}$−$t_{t1}$))

The time relationship between the terminal and the gateway can be expressed by:

Time at terminal=time at gateway+difference×1007 or $t_{t3}$=$t_{g3}$+x where $t_{t3}$=$t_{t2}$+½round-trip delay therefore:

$t_{g3}$+x=$t_{t2}$+½round-trip delay and so $x$=$t_{t2}$+½($t_{g3}$−$t_{g0}$−($t_{t2}$−$t_{t1}$))−$t_{g3}$.

So the time at the terminal={the time at the gateway−$t_{g3}$+$t_{t2}$+½($t_{g3}$−$t_{g0}$−($t_{t2}$−$t_{t1}$))}.

The media (e.g. video) delay from the terminal can be determined by the media RTP timestamp and the time when this packet is received. The media RTP timestamp must first be converted to terminal time reference (using the relationship between RTP and RTCP timestamps in SR packet) and then by using the above time relationship converted to the gateway time reference. The difference between this gateway time and the gateway time when the RTP packet is received is the intrinsic device transmission delay from the terminal. If the "base" intrinsic device transmission delay is calculated during calibration of the gateway, future calculations can be used to adjust the variable device transmission delay. Since the calculation also includes a round-trip delay element, any network propagation effects are automatically included.

The method of calibrating a network gateway described above may be significantly cheaper to implement than a system based on integrated audio-video telephone multimedia terminals. For example, the invention allows use of a conventional telephone and conventional PC, with the addition of a small solid state camera affixed, for example, externally on the PC or monitor, and a suitable video capture card. The invention may also reduce barriers to acceptance of audio-video telephony by allowing use of existing audio telephony equipment, and telephony and data networks, whilst at the same time permitting the audio portion of a call to continue if there is a failure in the video portion.

It is to be recognized that various alterations, modifications, or additions may be introduced into the constructions and arrangements of parts described above without departing from the spirit or ambit of the present invention.

The invention claimed is:

1. A method of calibrating a network gateway in order to synchronize audible and visible outputs from a multimedia terminal comprising an audio communication device and a separate video communication device, when the signal to the audio device, and optionally also the signal to the video device, is/are routed through a network gateway that imposes an intrinsic gateway processing delay on at least one signal routed through the gateway, comprising the steps of:
   i) providing an audio signal and a video signal;
   ii) supplying as an input to the gateway the audio signal and optionally also the video signal so that said signal(s) is/are routed through the gateway to the multimedia terminal;
   iii) detecting any mismatch in the synchronization between the audible and visible outputs from the audio device and the video device owing at least partly to the intrinsic gateway processing delay(s);
   iv) adjusting a variable delay in the gateway on a signal routed through the gateway until the audible and visible outputs from the separate devices are effectively synchronized; and,
   v) storing the variable delay in the gateway for future use.

2. A method of calibrating a network gateway as claimed in claim 1, in which the video device is an integrated audio and video telephony device which forms with the separate audio communication device a combined multimedia terminal.

3. A method of calibrating a network gateway as claimed in claim 1, in which the audio and video signals are effectively synchronized with each other prior to at least the audio signal being supplied as an input to the gateway.

4. A method of calibrating a network gateway as claimed in claim 1, in which the video signal is not routed through the gateway, but a data signal from the video device is routed through the gateway.

5. A method of calibrating a network gateway as claimed in claim 4, in which step i) includes providing a synchronization marker in the audio signal and video signal, and step vii) includes detecting a mismatch between the synchronization markers.

6. A method of calibrating a network gateway as claimed in claim 1, when the signals to and from both the audio device and the video device are routed through the gateway and when signals to said devices may both be looped back to the gateway from said devices, at least one of said devices imposing an intrinsic device transmission delay on a signal looped back to the gateway, comprising the steps after step iv) of:
   vi) looping back the signals from the audio device and video device to the gateway;
   vii) detecting any mismatch in the synchronization between the looped back signals from the audio device and video device at the gateway owing to the intrinsic device transmission delay(s);
   viii) adjusting a variable device transmission delay in the gateway so that the looped back signals at the gateway are effectively synchronized; and,
   ix) storing the variable device transmission delay in the gateway for future use.

7. A method of calibrating a network gateway as claimed in claim 1, when the signals to and from both the audio device and video device are routed through the gateway, at least one of said devices imposing an intrinsic device transmission delay on a signal transmitted to the gateway, comprising the steps after step iv) of:
   x) providing from the audio device and video device, respectively, an audio signal and a video signal;
   xi) supplying said signals as an input to the gateway so that said signals are routed through the gateway to a second multimedia terminal for which the gateway has already been calibrated according to the method of claim 1, the second multimedia terminal comprising a first-calibrated audio communication device and a first-calibrated video communication device;
   xii) detecting any mismatch in the synchronization between the audible and visible outputs from the first-calibrated audio device and first-calibrated video device owing to the intrinsic device transmission delays of the audio device and video device;
   xiii) adjusting a variable device transmission delay in the gateway on a signal routed through the gateway until the audible and visible outputs from the first-calibrated audio device and first-calibrated video device are effectively synchronized; and,
   xiv) storing the variable device transmission delay in the gateway for future use.

8. A method of calibrating a network gateway as claimed in claim 7, in which the calibration once achieved is maintained when the multimedia terminal is in audio and video communication with an H.323 compliant multimedia terminal via the gateway, wherein the gateway determines a relative time difference between itself and the H.323 compliant multimedia terminal in order to increase or decrease a device transmission delay of the H.323 complaint multimedia terminal in order to synchronize the audible and visible outputs from the multimedia terminal.

9. A method of calibrating a network gateway as claimed in claim 1, in which the calibration once achieved is maintained by a user entering data into a data entry means associated with either the audio device or the video device, said data being interpreted by the network gateway as a command to increase or decrease a variable delay in the gateway in order to synchronize the audible and visible outputs from the multimedia terminal.

10. A multimedia communication system, comprising a network gateway and one or more multimedia terminal(s), each terminal comprising an audio communication device and a separate video communication device, wherein the gateway has an input for receiving a signal from the audio device, and optionally also an input for receiving a signal from the video device so that said signal(s) may be routed through the gateway, wherein the network gateway has been calibrated according to the method of claim 1 in order to synchronize audible and visible outputs from, respectively, the audio device and video device.

11. The method of claim 1, wherein said gateway receives a signal formatted according to a first standard, and transcodes and repackages the signal to be formatted in a second standard, said second standard different from said first standard.

12. The method of claim 1, wherein said variable delay is dynamically adjusted.

13. A method of calibrating a network gateway in order to synchronize audible and visible outputs from a multimedia terminal comprising an audio communication device and a separate video communication device, when the signal to the audio device and the signal to the video device are routed through a network gateway that imposes an intrinsic gateway processing delay on at least one signal routed through the gateway, comprising the steps of:
  a) providing a first test audio signal with a marker;
  b) providing from an integrated audio and video communication device a video signal and a first audio signal sourced from the first test audio signal;
  c) providing from a separate audio device a second audio signal sourced from the first test audio signal;
  d) supplying as an input to the gateway the first audio signal, the second audio signal and the video signal so that said signals are routed through the gateway to the multimedia terminal;
  e) using the gateway to detect the relative delay between the first audio signal and the second audio signal owing at least partly to the intrinsic gateway processing delay(s);
  f) determining a skew delay at the gateway between the first audio signal and the video signal from the integrated audio and video communication device, owing at least partly to the intrinsic gateway processing delay(s);
  g) summing said relative delay and the skew delay to generate a variable device transmission delay between the video signal and the second audio signal; and,
  h) storing the variable device transmission delay in the gateway for future use.

14. A method of calibrating a network gateway as claimed in claim 13, in which following step h), the method comprises the steps of:
  i) providing from the gateway a second audio test signal with marker;
  j) transmitting the second audio test signal from the gateway to the separate audio device;
  k) providing an audio coupling between the separate audio device and the audio device of the integrated audio and video communication device;
  l) looping back the second audio test signal from the separate audio device through the integrated audio and video communication device to the gateway;
  m) determining a first loop back delay in the second audio test signal between the transmission and reception of said signal at the gateway, including any intrinsic gateway processing delay(s); and,
  n) storing the first loop back delay in the gateway for future use.

15. A method of calibrating a network gateway as claimed in claim 14, in which following step n), the method comprises the steps of:
  o) providing from the gateway and a third audio test signal with marker and a video test signal, said signals being effectively synchronized;
  p) transmitting the third audio test signal and video test signals from the gateway to the integrated audio and video communication device;
  q) providing an audio coupling between the separate audio device and the audio device of the integrated audio and video communication device;
  r) looping-back the third audio test signal from the integrated audio and video communication device through the separate audio device to the gateway;
  s) determining a second loop back delay in the third audio test signal between the transmission and reception of said signal at the gateway, including any intrinsic gateway processing delay(s); and,
  t) storing the second loop back delay in the gateway for future use.

16. A method of calibrating a network gateway as claimed in claim 15, in which following step t), the method comprises the steps of:
  u) calculating a variable sensory output delay from a sum of the variable device transmission delay, first loop back delay and second loop back delay; and,
  v) storing the variable sensory output delay in the gateway for future use.

17. A method of calibrating a network gateway as claimed in claim 14, in which the calibration once achieved is maintained when the multimedia terminal is in audio and video communication with an H.323 compliant multimedia terminal via the gateway, wherein the gateway determines a relative time difference between itself and the H.323 compliant multimedia terminal in order to increase or decrease a device transmission delay of the H.323 complaint multimedia terminal in order to synchronize the audible and visible outputs from the multimedia terminal.

18. A method of calibrating a network gateway as claimed in claim 13, in which the calibration once achieved is maintained by a user entering data into a data entry means associated with either the audio device or the video device, said data being interpreted by the network gateway as a command to increase or decrease a variable delay in the gateway in order to synchronize the audible and visible outputs from the multimedia terminal.

19. A multimedia communication system, comprising a network gateway and one or more multimedia terminal(s), each terminal comprising an audio communication device and a separate video communication device, wherein the gateway has an input for receiving a signal from the audio device, and optionally also an input for receiving a signal from the video device so that said signal(s) may be routed through the gateway, wherein the network gateway has been calibrated according to the method of claim 13 in order to synchronize audible and visible outputs from, respectively, the audio device and video device.

* * * * *